(12) United States Patent
Bailey, Jr.

(10) Patent No.: US 10,360,625 B2
(45) Date of Patent: Jul. 23, 2019

(54) DYNAMICALLY ADAPTIVE POLICY MANAGEMENT FOR SECURING MOBILE FINANCIAL TRANSACTIONS

(75) Inventor: Samuel A. Bailey, Jr., Boca Raton, FL (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 347 days.

(21) Appl. No.: 12/820,190

(22) Filed: Jun. 22, 2010

(65) Prior Publication Data
US 2011/0313930 A1    Dec. 22, 2011

(51) Int. Cl.
G06Q 40/00   (2012.01)
G06Q 10/10   (2012.01)
G06Q 20/38   (2012.01)

(52) U.S. Cl.
CPC ............ *G06Q 40/00* (2013.01); *G06Q 10/10* (2013.01); *G06Q 20/382* (2013.01)

(58) Field of Classification Search
CPC .............................. H04L 63/20; G06Q 40/00
USPC ..................................................... 705/50–79
See application file for complete search history.

(56) References Cited

U.S. PATENT DOCUMENTS

| | | | |
|---|---|---|---|
| 4,796,025 A | 1/1989 | Farley et al. | |
| 5,053,956 A | 10/1991 | Donald et al. | |
| 5,784,566 A | 7/1998 | Viavant et al. | ......... 395/200.59 |
| 5,796,942 A | 8/1998 | Esbensen | |
| 6,088,450 A | 7/2000 | Davis et al. | |
| 6,321,338 B1 | 11/2001 | Porras et al. | |
| 6,330,546 B1 | 12/2001 | Gopinathan et al. | |
| 6,484,182 B1* | 11/2002 | Dunphy | ............ G06F 17/30958 700/231 |
| 6,530,024 B1 | 3/2003 | Proctor | |
| 6,590,580 B2 | 7/2003 | Horikawa et al. | |
| 6,611,863 B1 | 8/2003 | Banginwar | |

(Continued)

FOREIGN PATENT DOCUMENTS

| | | |
|---|---|---|
| CN | 1269030 | 10/2000 |
| CN | 101189859 | 5/2008 |

(Continued)

OTHER PUBLICATIONS

Wagener G., State R., Dulaunoy A., Engel T. (2009) Self Adaptive High Interaction Honeypots Driven by Game Theory. [online] Lecture Notes in Computer Sci, vol. 5873. Springer, Berlin, Heidelberg. [retrieved on Mar. 29, 2019][retrieved from the Internet: <URL: https://doi.org/10.1007/978-3-642-05118-0_51> (Year: 2009).*

(Continued)

*Primary Examiner* — James M Detweiler
*Assistant Examiner* — Monica A Mandel
(74) *Attorney, Agent, or Firm* — Snell & Wilmer L.L.P.

(57) ABSTRACT

A system for securing a mobile financial transaction using an adaptive security policy is provided by presenting, via an external terminal, an input request associated with a vertex of the security policy. User input is received via the external terminal in response to the input request. A rule associated with the vertex is retrieved from a database. An edge is selected from a plurality of edges associated with the vertex according to the retrieved rule. A communication session of the external terminal is routed to a subsequent vertex via the selected edge.

18 Claims, 7 Drawing Sheets

(56) References Cited

U.S. PATENT DOCUMENTS

| | | | |
|---|---|---|---|
| 6,681,249 B2 | 1/2004 | Christensen et al. | |
| 6,744,780 B1 | 6/2004 | Gu et al. | |
| 6,961,858 B2* | 11/2005 | Fransdonk | G06F 21/10 380/281 |
| 6,965,294 B1 | 11/2005 | Elliott et al. | |
| 7,020,635 B2* | 3/2006 | Hamilton | G06Q 20/00 705/51 |
| 7,058,968 B2 | 6/2006 | Rowland et al. | |
| 7,080,049 B2* | 7/2006 | Truitt | G06Q 20/16 380/30 |
| 7,090,128 B2* | 8/2006 | Farley | H04L 67/2823 235/384 |
| 7,095,850 B1* | 8/2006 | McGrew | H04L 9/065 380/37 |
| 7,107,462 B2* | 9/2006 | Fransdonk | G06Q 20/12 380/282 |
| 7,150,045 B2* | 12/2006 | Koelle | G06F 21/552 380/201 |
| 7,152,242 B2 | 12/2006 | Douglas | |
| 7,174,462 B2 | 2/2007 | Pering et al. | |
| 7,260,844 B1 | 8/2007 | Tidwell et al. | |
| 7,305,709 B1 | 12/2007 | Lymer et al. | |
| 7,565,693 B2 | 7/2009 | Shin et al. | |
| 7,587,502 B2* | 9/2009 | Crawford | A63F 13/12 463/42 |
| 7,620,606 B2* | 11/2009 | Gentry | G06Q 20/02 380/277 |
| 7,660,795 B2 | 2/2010 | Barrett et al. | |
| 7,685,254 B2 | 3/2010 | Pandya | |
| 7,711,586 B2* | 5/2010 | Aggarwal | G06Q 10/02 700/14 |
| 7,835,721 B2 | 11/2010 | Tuulos et al. | |
| 7,895,649 B1 | 2/2011 | Brook et al. | |
| 7,921,205 B2 | 4/2011 | Shen et al. | |
| 7,937,353 B2 | 5/2011 | Bernoth et al. | |
| 8,001,054 B1 | 8/2011 | Peart et al. | |
| 8,074,282 B1 | 12/2011 | Lymer et al. | |
| 8,087,085 B2 | 12/2011 | Hu et al. | |
| 8,117,458 B2 | 2/2012 | Osborn, III et al. | |
| 8,146,160 B2 | 3/2012 | Orr et al. | |
| 8,272,061 B1 | 9/2012 | Lotem et al. | |
| 8,392,975 B1 | 3/2013 | Raghunath | |
| 8,406,119 B2 | 3/2013 | Taylor et al. | |
| 8,621,636 B2 | 12/2013 | Bailey | |
| 8,639,629 B1* | 1/2014 | Hoffman | G06Q 20/20 705/44 |
| 8,650,129 B2 | 2/2014 | Bailey | |
| 8,752,142 B2 | 6/2014 | Bailey | |
| 8,850,539 B2 | 9/2014 | Bailey | |
| 8,924,296 B2 | 12/2014 | Bailey | |
| 8,955,140 B2 | 2/2015 | Bailey | |
| 8,959,568 B2 | 2/2015 | Hudis et al. | |
| 9,027,120 B1 | 5/2015 | Tidwell et al. | |
| 9,213,975 B2 | 12/2015 | Bailey | |
| 9,292,695 B1 | 3/2016 | Bassett | |
| 9,712,552 B2 | 7/2017 | Bailey | |
| 2002/0129145 A1 | 9/2002 | Chow | |
| 2002/0194096 A1 | 12/2002 | Falcone et al. | |
| 2002/0194119 A1 | 12/2002 | Wright et al. | |
| 2003/0076959 A1 | 4/2003 | Chui et al. | |
| 2003/0110392 A1 | 6/2003 | Aucsmith et al. | |
| 2003/0145226 A1 | 7/2003 | Bruton, III et al. | |
| 2003/0223584 A1 | 12/2003 | Bradley | |
| 2004/0015719 A1 | 1/2004 | Lee et al. | |
| 2004/0030927 A1 | 2/2004 | Zuk | |
| 2004/0049698 A1 | 3/2004 | Ott et al. | |
| 2004/0187034 A1 | 9/2004 | Tamura et al. | |
| 2005/0010768 A1 | 1/2005 | Light et al. | |
| 2005/0091527 A1 | 4/2005 | Swander et al. | 713/201 |
| 2005/0125360 A1 | 6/2005 | Tidwell et al. | |
| 2005/0164675 A1 | 7/2005 | Tuulos et al. | |
| 2005/0182969 A1 | 8/2005 | Ginter et al. | |
| 2005/0201561 A1 | 9/2005 | Komano et al. | |
| 2006/0085839 A1 | 4/2006 | Brandt et al. | 726/2 |
| 2006/0090198 A1 | 4/2006 | Aaron | 726/6 |
| 2006/0094400 A1 | 5/2006 | Beachem et al. | |
| 2006/0161435 A1 | 7/2006 | Atef et al. | |
| 2006/0200427 A1 | 9/2006 | Morrison et al. | 705/67 |
| 2006/0200666 A1 | 9/2006 | Bailey, Jr. | 713/168 |
| 2006/0225132 A1 | 10/2006 | Swift et al. | 726/11 |
| 2006/0265739 A1 | 11/2006 | Bhaskaran et al. | |
| 2006/0276173 A1 | 12/2006 | Srey et al. | |
| 2006/0291447 A1 | 12/2006 | Siliquini et al. | |
| 2007/0016955 A1 | 1/2007 | Goldberg et al. | 726/25 |
| 2007/0036314 A1 | 2/2007 | Kloberdans et al. | |
| 2007/0101432 A1 | 5/2007 | Carpenter | |
| 2007/0143832 A1 | 6/2007 | Perrella et al. | 726/5 |
| 2007/0234412 A1 | 10/2007 | Smith et al. | 726/11 |
| 2007/0250709 A1 | 10/2007 | Bailey, Jr. | 713/168 |
| 2008/0082380 A1 | 4/2008 | Stephenson | |
| 2008/0086759 A1 | 4/2008 | Colson | |
| 2008/0096529 A1 | 4/2008 | Zellner | |
| 2008/0098464 A1 | 4/2008 | Mizrah | |
| 2008/0104700 A1* | 5/2008 | Fagone | G06F 21/55 726/22 |
| 2008/0107090 A1 | 5/2008 | Thomson et al. | |
| 2008/0120707 A1 | 5/2008 | Ramia | |
| 2008/0178294 A1 | 7/2008 | Hu et al. | |
| 2008/0243439 A1 | 10/2008 | Runkle | |
| 2008/0262990 A1* | 10/2008 | Kapoor et al. | 706/20 |
| 2008/0270579 A1 | 10/2008 | Herz et al. | 709/219 |
| 2008/0307487 A1 | 12/2008 | Choyi et al. | |
| 2009/0025084 A1 | 1/2009 | Siourthas et al. | |
| 2009/0044279 A1* | 2/2009 | Crawford | G06F 21/55 726/26 |
| 2009/0112767 A1 | 4/2009 | Hammad | |
| 2009/0125977 A1 | 5/2009 | Chander et al. | |
| 2009/0156180 A1 | 6/2009 | Slavin | |
| 2009/0158425 A1 | 6/2009 | Chan et al. | 726/21 |
| 2009/0165125 A1 | 6/2009 | Brown et al. | |
| 2009/0216910 A1* | 8/2009 | Duchesneau | 709/250 |
| 2009/0222907 A1 | 9/2009 | Guichard | |
| 2009/0271844 A1 | 10/2009 | Zhang et al. | 726/2 |
| 2009/0292568 A1 | 11/2009 | Khosravani et al. | |
| 2009/0300716 A1 | 12/2009 | Ahn | 726/1 |
| 2009/0328219 A1 | 12/2009 | Narayanaswamy | |
| 2010/0010874 A1 | 1/2010 | Howard et al. | |
| 2010/0082513 A1 | 4/2010 | Liu | |
| 2010/0094767 A1 | 4/2010 | Miltonberger | |
| 2010/0251388 A1 | 9/2010 | Dorfman | |
| 2010/0275010 A1 | 10/2010 | Ghirardi | |
| 2010/0280950 A1 | 11/2010 | Faith | |
| 2010/0293090 A1 | 11/2010 | Domenickos et al. | |
| 2010/0294927 A1 | 11/2010 | Nelson et al. | |
| 2011/0016513 A1 | 1/2011 | Bailey | |
| 2011/0154034 A1 | 6/2011 | Bailey | |
| 2011/0154497 A1 | 6/2011 | Bailey | |
| 2011/0178933 A1 | 7/2011 | Bailey | |
| 2011/0252479 A1 | 10/2011 | Beresnevichiene et al. | |
| 2011/0313925 A1 | 12/2011 | Bailey | |
| 2011/0314529 A1 | 12/2011 | Bailey | |
| 2014/0156515 A1 | 6/2014 | Bailey | |
| 2014/0379581 A1 | 12/2014 | Bailey | |
| 2015/0012979 A1 | 1/2015 | Bailey | |
| 2015/0161611 A1 | 6/2015 | Duke | |
| 2016/0057129 A1 | 2/2016 | Bailey | |
| 2017/0048277 A1 | 2/2017 | Bailey | |
| 2017/0187744 A1 | 6/2017 | Bailey | |

FOREIGN PATENT DOCUMENTS

| | | |
|---|---|---|
| CN | 101300566 | 11/2008 |
| CN | 101438251 | 5/2009 |
| GB | 2456742 | 7/2009 |
| JP | 2004078539 A | 3/2004 |
| JP | 2004280724 | 10/2004 |
| JP | 2009110334 | 5/2009 |
| JP | 2009523275 | 6/2009 |

(56) References Cited

FOREIGN PATENT DOCUMENTS

| JP | 2011517859 | 6/2011 |
|---|---|---|
| WO | 2009021070 | 2/2009 |

OTHER PUBLICATIONS

Selim Aissi et al., "Security for Mobile Networks and Platforms", Artech House Publishers (2006), 329 pages.
Zhigun Chen, "Java Card Technology for Smart Cards: Architecture and Programmers Guide", Prentice Hall (2000), pp. 57-63.
Clayton M. Christensen and Michael E. Raynor, "The Innovators Solution: Creating and Sustaining Successful Growth" Harvard Business Press (2003), pp. 31-71.
Edward T. Dowling, "Mathematical Methods for Business and Economics", McGraw-Hill (2009), pp. 89-127 and 177-196.
Robert Gibbons, "Game Theory for Applied Economists", Princeton University Press (1992), pp. 29-48 and 173-255.
Charles W. L. Hill and Gareth R. Jones, "Strategic Management Theory: An Integrated Approach", South-Western College Pub, 9th edition (2009), pp. 208-241.
Michael Howard and David Leblanc, "Writing Secure Code, Practical Strategies and Techniques for Secure Application Coding in a Networked World", Microsoft Press, 2nd ed. (2003), pp. 69-124, 259-298, and 455-476.
Ronald L. Krutz and Russell Dean Vines, "The CISSP Prep Guide, Mastering the Ten Domains of Computer Security", Wiley (2001), pp. 183-213.
Peter Morris, "Introduction to Game Theory", Springer Verlag New York, Inc. (1994), pp. 65-97.
Winn Schwartau, "Time Based Security", Interpact Press (1999), pp. 33-36, 65-74, and 121-125.
Shreeraj Shah, "Hacking Web Services", Charles River Media (2006), pp. 171-221, 271-298.
Fred B. Wrixon, "Codes Ciphers & Other Cryptic and Clandestine Communications, Making and Breaking Secret Messages from Hieroglyphs to the Internet", Black DogLrvrnthal Pub. (1998), pp. 298-309.
Colin English et al., "Dynamic Trust Models for Ubiquitous Computing Environments", University of Strathclyde, Glasgow, Scotland, Department of Computer and Information Sciences (2002).
Graham Messick, "Cyber War: Sabotaging the System" (Nov. 8, 2009), CBS Interactive Inc., http://www.cbsnews.com/stories/2009/11/06/60minutes/main5555565.shtml?tag=currentVideoInfo;segmentUtilities.
Peng Ning and Sushil Jajodia, "Intrusion Detection Techniques", http://discovery.csc.ncsu.edu/Courses/csc774-S03/IDTechniques.pdf (last visited Sep. 24, 2010).
Brian Wotring, "Host Integrity Monitoring: Best Practices for Deployment" (Mar. 31, 2004), http://www.symantec.com/connect/articles/host-integrity-monitoring-best-practices-deployment.
International Search Report and Written Opinion issued by Int'l Search Authority in counterpart Int'l Patent Appl'n No. PCT/US2011/041147, dated Nov. 14, 2011, 7 pages.
Extended European Search Report dated Jul. 22, 2016 in European Application No. 10800510.9.
International Search Report and Written Opinion dated Feb. 2, 2011 in Application No. PCT/US2010/059883.
International Search Report and Written Opinion dated Feb. 2, 2011 in Application No. PCT/US2010/059887.
International Search Report and Written Opinion dated Feb. 11, 2011 in Application No. PCT/US2010/059889.
Office Action dated Jun. 16, 2016 in U.S. Appl. No. 14/175,475.
Office Action dated Aug. 5, 2011 in U.S. Appl. No. 12/640,289.
International Search Report and Written Opinion dated Nov. 14, 2011 in Application No. PCT/US2011/041147.
Office Action dated Dec. 9, 2011 in U.S. Appl. No. 12/820,186.
International Preliminary Report on Patentability dated Jan. 17, 2012 in Application No. PCT/US2010/042043.
Final Office Action dated Jan. 19, 2012 in U.S. Appl. No. 12/640,289.
Office Action dated Jan. 20, 2012 in U.S. Appl. No. 12/504,828.
International Search Report and Written Opinion dated Nov. 15, 2010 in Application No. PCT/US2010/042043.
Final Office Action dated Mar. 29, 2012 in U.S. Appl. No. 12/820,186.
Office Action dated Mar. 30, 2012 in U.S. Appl. No. 12/640,183.
Advisory Action dated May 9, 2012 in U.S. Appl. No. 12/640,289.
Office Action dated Jun. 15, 2016 in U.S. Appl. No. 14/599,151.
International Preliminary Report on Patentability dated Jun. 19, 2012 in Application No. PCT/US2010/059887.
International Preliminary Report on Patentability dated Jun. 19, 2012 in Application No. PCT/US2010/059883.
Office Action dated Jun. 25, 2012 in U.S. Appl. No. 12/640,289.
Final Office Action dated Jul. 2, 2012 in U.S. Appl. No. 12/504,828.
Advisory Action dated Jul. 10, 2012 in U.S. Appl. No. 12/820,186.
Office Action dated Feb. 28, 2013 in Mexican Application No. MX/a/2012/000606.
International Preliminary Report on Patentability dated Jul. 24, 2012 in Application No. PCT/US2010/059889.
Office Action dated Aug. 28, 2012 in U.S. Appl. No. 12/820,186.
Office Action dated Sep. 4, 2012 in U.S. Appl. No. 12/690,461.
Office Action dated Sep. 4, 2012 in U.S. Appl. No. 12/820,193.
Final Office Action dated Oct. 11, 2012 in U.S. Appl. No. 12/640,183.
Advisory Action dated Oct. 11, 2012 in U.S. Appl. No. 12/504,828.
Final Office Action dated Dec. 19, 2012 in U.S. Appl. No. 12/820,186.
Notice of Allowance dated Dec. 26, 2012 in U.S. Appl. No. 12/690,461.
International Preliminary Report on Patentability dated Dec. 28, 2012 in Application No. PCT/US2011/041147.
Advisory Action dated Jan. 16, 2013 in U.S. Appl. No. 12/640,183.
Final Office Action dated Mar. 5, 2013 in U.S. Appl. No. 12/820,193.
Office Action dated Mar. 28, 2013 in U.S. Appl. No. 12/640,183.
Advisory Action dated May 29, 2013 in U.S. Appl. No. 12/820,193.
Office Action dated Jun. 24, 2013 in U.S. Appl. No. 12/504,828.
Office Action dated Jul. 15, 2013 in U.S. Appl. No. 12/820,193.
Notice of Allowance dated Aug. 21, 2013 in U.S. Appl. No. 12/640,183.
Office Action received Sep. 5, 2013 in Mexican Application No. MX/a/2012/000606.
Final Office Action dated Sep. 30, 2013 in U.S. Appl. No. 12/640,289.
Office Action dated Oct. 2, 2013 in U.S. Appl. No. 12/820,186.
Notice of Allowance dated Oct. 7, 2013 in U.S. Appl. No. 12/690,461.
Notice of Allowance dated May 27, 2016 in Canadian Application No. 2,767,862.
Notice of Allowance dated Dec. 2, 2013 in U.S. Appl. No. 12/504,828.
Office Action dated Jan. 24, 2014 in Japanese Application No. 2012-520759.
Office Action received Jan. 27, 2014 in Mexican Application No. MX/a/2012/000606.
Final Office Action dated Jan. 28, 2014 in U.S. Appl. No. 12/820,193.
Office Action dated Mar. 3, 2014 in Chinese Application No. 201080029478.7.
Notice of Allowance dated May 5, 2014 in U.S. Appl. No. 12/820,186.
Corrected Notice of Allowability dated May 8, 2014 in U.S. Appl. No. 12/504,828.
Notice of Allowance dated May 22, 2014 in U.S. Appl. No. 12/820,193.
Office Action dated Oct. 7, 2014 in U.S. Appl. No. 14/139,840.
Office Action dated Jan. 9, 2015 in U.S. Appl. No. 14/480,169.
Final Office Action dated Apr. 23, 2015 in U.S. Appl. No. 14/480,169.
Office Action dated Apr. 29, 2015 in U.S. Appl. No. 14/492,771.
Office Action dated Jun. 4, 2015 in Canadian Application No. 2,767,862.
Advisory Action dated Aug. 5, 2015 in U.S. Appl. No. 14/480,169.
Notice of Allowance dated Aug. 12, 2015 in U.S. Appl. No. 14/492,771.
Office Action dated Nov. 2, 2015 in U.S. Appl. No. 14/252,276.
Office Action dated Feb. 1, 2016 in U.S. Appl. No. 14/480,169.
Office Action dated Feb. 22, 2016 in U.S. Appl. No. 12/640,289.
Notice of Allowance dated Feb. 24, 2016 in U.S. Appl. No. 14/252,276.
Final Office Action dated Jul. 14, 2016 in U.S. Appl. No. 12/640,289.
Advisory Action dated Sep. 23, 2016 in U.S. Appl. No. 12/640,289.
Final Office Action dated Sep. 29, 2016 in U.S. Appl. No. 14/599,151.

(56) References Cited

OTHER PUBLICATIONS

Notice of Allowance dated Oct. 13, 2016 in U.S. Appl. No. 14/175,475.
U.S. Appl. No. 15/337,246, filed Oct. 28, 2016 entitled "Selectable Encryption Methods".
Office Action dated Nov. 14, 2016 in U.S. Appl. No. 12/640,289.
Advisory Action dated Dec. 27, 2016 in U.S. Appl. No. 14/599,151.
Office Action dated Jan. 17, 2017 in U.S. Appl. No. 14/599,151.
Office Action dated Jun. 1, 2017 in Chinese Application No. 201510029327.6.
Advisory Action dated Jun. 12, 2017 in U.S. Appl. No. 14/480,169.
Office Action dated Jun. 16, 2017 in U.S. Appl. No. 14/933,165.
U.S. Appl. No. 15/629,492, filed Jun. 21, 2017 entitled "Mobile Device Sensor Data".
Notice of Allowance dated Jun. 28, 2017 in U.S. Appl. No. 12/640,289.
Paquet, "Network Security Concepts and Policies," Sample chaper is provided courtes of Cisco Press, Feb. 5, 2013, 29 pages, http://ciscopress.com/articles/article/asp?p=1998559, retrieved online Jun. 17, 2017.
Notice of Allowance dated Feb. 23, 2017 in U.S. Appl. No. 15/166,673.
Bailey, U.S. Appl. No. 15/456,252, filed Mar. 10, 2017 and entitled Security Safeguard Modification.
Final Office Action dated Mar. 20, 2017 in U.S. Appl. No. 14/480,169.
Final Office Action dated Mar. 29, 2017 in U.S. Appl. No. 12/640,289.
Notice of Allowance dated May 9, 2017 in U.S. Appl. No. 14/599,151.
Office Action dated Dec. 4, 2017 in U.S. Appl. No. 14/480,169.
Office Action dated Oct. 6, 2017 in U.S. Appl. No. 15/629,492.
Notice of Allowance dated Oct. 19, 2017 in U.S. Appl. No. 15/456,252.
Notice of Allowance dated Oct. 19, 2017 in U.S. Appl. No. 14/933,165.
Office Action dated Jan. 4, 2018 in U.S. Appl. No. 15/819,166.
Final Office Action dated Apr. 18, 2018 in U.S. Appl. No. 14/480,169.
Advisory Action dated Jun. 29, 2018 in U.S. Appl. No. 14/480,169.
Notice of Allowance dated Jul. 2, 2018 in U.S. Appl. No. 15/819,166.
Office Action dated Jul. 12, 2018 in Eurpoean Application No. 10800510.9.

\* cited by examiner

DYNAMICALLY ADAPTIVE POLICY MANAGEMENT FOR SECURING MOBILE FINANCIAL TRANSACTIONS

BACKGROUND OF THE INVENTION

Field of the Invention

The present invention generally relates to information security systems, and more particularly, to management of dynamically adaptive policies to secure mobile financial transactions.

Related Art

With the proliferation of mobile communication devices, such as mobile telephones, financial account holders that have such devices have begun to use them to complete financial transactions. Enabling financial account holders to do so, however, poses unique security risks for financial account issuers, particularly because security capabilities and risks vary widely across different mobile communication devices and different mobile communication networks. For example, typical payment systems involve point-of-sale (POS) terminals that are usually owned and designed by either financial transaction issuers or merchants. In contrast, because mobile communication devices are manufactured by various manufacturers and can be modified by third parties, financial account issuers have less control and knowledge of the security capabilities and risks associated with them. This makes it more difficult to control the security of financial transactions that are completed using mobile communication devices. Security measures vary based on particular models of mobile communication devices, thus compounding this inherent security risk.

The risk for financial account issuers is further complicated by the mobility of mobile communication devices. Each location in which mobile communication devices can be operated potentially has a different security environment. As a result, different security measures for each location are necessary. For example, bringing a mobile communication device into a foreign or visiting country may require the mobile communication device to roam on a foreign or visiting mobile communication network, which has inherently different security countermeasures, attack scenarios, risks, capabilities, and other characteristics.

Security designers perform a labor-intensive and exhaustive analysis of the risks associated with each component of a new network in an attempt to safely interface their existing security system with the new network. The existing security system is often modified to accommodate the risks associated with the new network. This process takes a substantial amount of time and thus limits the speed with which financial account issuers can enter new markets that utilize mobile-based financial transaction networks. As a consequence, they can lose market share.

In addition, security designers typically assume that all security characteristics and risks of the network components will remain static, or remain within a tolerance related to nominal protection, once the system is deployed. A typical security system thus utilizes a particular set of security measures deployed until the security system is taken offline and either replaced or modified. In other words, if risks of the security system change, for example, due to an innovation, a new service, discovery of a design or product flaw, breach of a security measure by an attacker, etc., a maintenance window or an outage must be realized to enable the security system to be modified to respond to a security breach, patch, or upgrade. Such a system cannot adapt dynamically to various detected feedback relating to changes impacting the security situation of the network. Typical security systems, therefore, lack the adaptability necessary to be suitable for mobile-based financial transaction systems that must constantly innovate to adapt to changing markets, services, and business models. Moreover, the static security measures of typical fortress security systems increase the ease with which internal and external attackers can circumvent less adaptive security measures. As payment and network systems adapt to next generation payment and communication, the attacks and exploits will also evolve into next generation criminal exploits. As higher communication speeds, multiple communication channels, and multiple communication protocols become more common for convergent services, attack scenarios and protection mechanisms will be represented by matrices as opposed to the linear singularity used in traditional systems to represent exposure.

Notwithstanding the above-mentioned security risks, enabling mobile transactions is still a particularly attractive means for financial account issuers to enter the markets of non-bankable countries where widespread POS infrastructure is neither available nor practical.

Given the foregoing, it would be useful to be able to continuously detect changes in network security characteristics, and adapt based on these detected changes to maintain an acceptable level of security for existing and new network connections including merchants, customers, and partners for visiting and home networks.

It also would be useful to enable business entities, such as financial account issuers, to enter new markets (e.g., the mobile-based financial transaction market) with minimal modifications to their existing security system, and to accept new risk scenarios with the ability to manage magnitude of exposure by network segment, region, issuer, partner, device, and/or account across numerous device and network types.

In addition, it would be useful to enable the characterization of currently uncharacterized (e.g., non-domestic) communication network components and/or attributes to enable adaptation to the risks to maintain an acceptable level of security.

BRIEF DESCRIPTION OF THE INVENTION

The present invention meets the above-identified needs by providing systems, methods, and computer program products for management of dynamically adaptive policies to secure mobile financial transactions.

Trust mediator agents, which are associated with each network component, continuously detect changes or signatures in the security characteristics of each network component using sensors and feed the detected changes or signatures back to a trust mediator. The trust mediator uses the feedback from the trust mediator agents to determine whether and how to modify currently running security safeguards in order to maintain an appropriate level of security that considers the interdependency of each component and asset at risk. Modifications, if any, are communicated by the trust mediator to the appropriate network component via its associated trust mediator agent for implementation. The process is recursive and thus continuously adapts to changes in network security characteristics as they arise over time to strike a balance between the probability of loss and magnitude of loss versus acceptable risk to enable business transactions to continue without disruption at an account level and/or at a network component level.

A business entity (e.g., a financial account issuer) can integrate new communication networks having new security characteristics into their existing network without the need to perform an exhaustive and labor-intensive upfront analysis to estimate the security impact a new communication network will have on their existing network. Instead, the business entity can define rules, such as a threshold of acceptable risk, begin to communicate with the new network, and enable their existing security system to detect and adapt to the security characteristics of the new network while maintaining the acceptable risk acceptance level. Managing system interdependency relating to security signature state assists in evaluating changes related to new exploits, products, services, or innovations to reduce time-to-market while managing the acceptable level of risk exposed to the business within nominal levels to maintain brand and financial equity.

Users' expectations regarding security measures are taken into account. Thus, if a particular security measure is too inconvenient for a user, the security measure is modified or reduced to a minimal level within limits that do not degrade nominal protection for the system. This balances the risk acceptance of a firm with a convenience cost representing user or account holder countermeasure choice, and provides the issuer and the account holder with firm acceptable transaction risk elasticity. Alternatively, if the security measure provides too low a security level for the user to accept the security measure, it is modified or replaced with a more rigorous security measure with an alternate method. The effect is to increase the propensity for user satisfaction and thus movement towards equilibrium of strategy and payoff for usage of the system based on time, location, and relevance, and results in more efficient risk models to increase market share for the business entity. Users are offered choices to increase their propensity of adoption and use of security methods, while mitigating the circumnavigation of security controls that puts merchants, financers, and financees at risk.

In one embodiment, a system for securing a mobile financial transaction using an adaptive security policy is provided by presenting, via an external terminal, an input request associated with a vertex of the security policy. User input is received via the external terminal in response to the input request. A rule associated with the vertex is retrieved from a database. An edge is selected from a plurality of edges associated with the vertex according to the retrieved rule. A communication session of the external terminal is routed to a subsequent vertex via the selected edge.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the following drawings.

DETAILED DESCRIPTION

I. Overview

Figure 1:
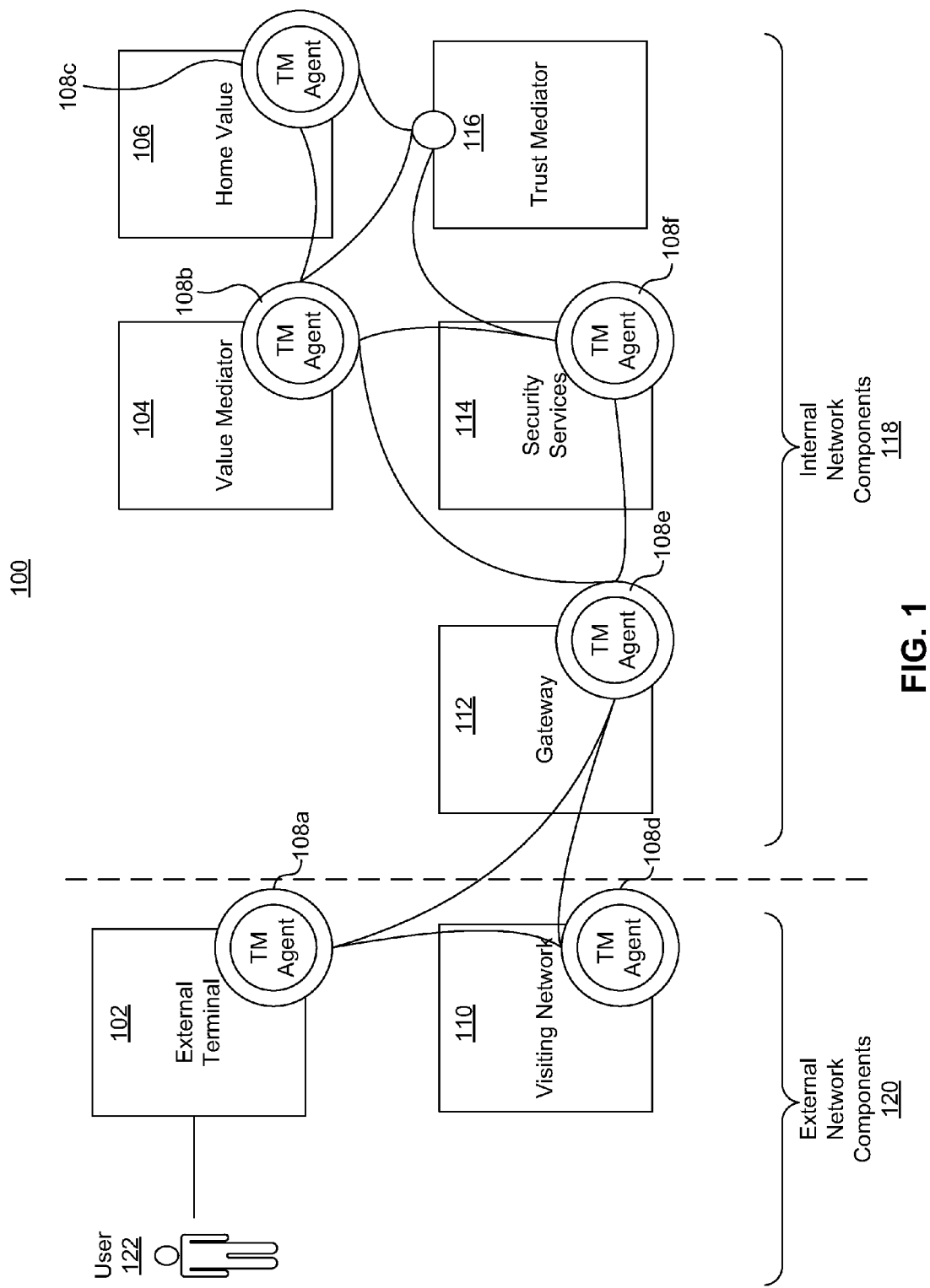
FIG. 1 is a diagram of an exemplary security system for adaptively securing mobile communication device transactions in accordance with an embodiment of the present invention.

The present invention is directed to a system for management of a dynamically adaptive policy to secure mobile financial transactions, which is now described in more detail herein in terms of an example mobile financial payment system. This is for convenience only and is not intended to limit the application of the present invention. In fact, after reading the following description, it will be apparent to one skilled in the relevant art(s) how to implement the following invention in alternative embodiments (e.g., general network security systems, mass transit security systems, homeland security systems, home and business security systems, etc.).

The terms "user," "consumer," "account holder," and/or the plural form of these terms are used interchangeably throughout herein to refer to those persons or entities capable of accessing, using, being affected by and/or benefiting from the present invention.

A "merchant" as used herein refers to any person, entity, distributor system, software and/or hardware that is a provider, broker and/or any other entity in the distribution chain of goods or services. For example, a merchant can be a grocery store, a retail store, a travel agency, a service provider, an online merchant or the like.

A "transaction account" as used herein refers to an account associated with an open account or a closed account system. The transaction account can exist in a physical or non-physical embodiment. For example, a transaction account can be distributed in non-physical embodiments such as an account number, frequent-flyer account, telephone calling account or the like. Furthermore, a physical embodiment of a transaction account can be distributed as a financial instrument.

An "account," "account number," or "account code," as used herein, can include any device, code, number, letter, symbol, digital certificate, smart chip, digital signal, analog signal, biometric or other identifier/indicia suitably configured to allow a consumer to access, interact with or communicate with a financial transaction system. The account number can optionally be located on or associated with any financial transaction instrument (e.g., a rewards, charge, credit, debit, prepaid, telephone, embossed, smart, magnetic stripe, bar code, transponder or radio frequency card).

The terms "financial account issuer," "account issuer," and "issuer," and/or the plural forms of these terms are used interchangeably throughout herein to refer to those persons or entities that provide transaction account(s) to account holders. For example, an issuer may be a credit card issuer, a bank, or any other financial institution.

In general, transaction accounts can be used for transactions between the user and merchant through any suitable online or offline communication network, such as, for example, a wired network, a wireless network, a telephone network, an intranet, the global, public Internet, and/or the like. Additionally, the user can complete transactions with the merchant using any suitable communication device, such as a point-of-interaction device (e.g., a point-of-sale (POS) device, a personal digital assistant (PDA), a mobile telephone, a kiosk, resource access, area access, entitlement access, etc.), a radio frequency enabled transaction card, and/or the like.

A financial transaction instrument (also referred to as a "payment device") can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument can also have electronic functionality provided by a network of electronic circuitry that is printed or otherwise incorporated onto or within the transaction instrument (and typically referred to as a "smart card"), or be a fob having a transponder and an RFID reader.

The term "safeguard," "security measure," "security safeguard," "protection method," "protection mechanism," and/or the plural forms of these terms are used interchangeably throughout herein to refer to any process, hardware, software, algorithm, countermeasure, or the like, that increases security, confidentiality, and/or integrity of data communicated over communication networks. For example, a safeguard can be a key length, an encryption/decryption algorithm, a checksum, a hash function, an access level, a password requirement, a fingerprint requirement, or the like. Protection mechanism(s) may be one-dimensional, i.e., composed of a single protection mechanisms, or multi-dimensional, composed of multiple protection mechanisms.

The term "security-related information" is used herein to refer to any data or information that can be used by a trust mediator (described below) as the basis for making decisions as to implementations of security policy. For example, security-related information can include data relating to threats, exploits, attacks, safeguards, security measures, security safeguards, protection mechanisms, financial transaction-related data, non-financial-transaction-related data, mobile phone usage data, magnitude data, loss expectancy data, and the like.

The terms "transaction" and "financial transaction," and/or the plural forms of these terms, are used interchangeably throughout herein to refer to any transfer of value between two or more parties and/or communication network endpoints.

The terms "mobile transaction" and "mobile financial transaction," and/or the plural forms of these terms, are used interchangeably throughout herein to refer to any transfer of value between two or more parties effectuated via communication network endpoints, with at least one of the communication network endpoints being a mobile communication device.

II. System

FIG. 1 is a diagram of an exemplary security system 100 for adaptively securing mobile communication device transactions in accordance with an embodiment of the present invention. As shown in FIG. 1, security system 100 includes both internal network components 118 and external network components 120. Internal network components 118 are network components that are internal to an issuer network. External network components 120 are network components that are external to the issuer network.

External network components 120 include an external terminal 102, which is any electronic communication device a consumer can use as an interface to complete a financial transaction with a merchant. Examples of types of financial transactions a user 122 may request include a purchase at a point-of-sale (POS) device, a transfer of funds from an account of user 122 to that of another user, a mobile-to-mobile fund transfer, a transfer of funds between two accounts commonly owned by user 122, a request for data stored in one of internal network components 118 in association with an account of user 122, a request to modify data stored in one of internal network components 118 in association with an account of user 122, etc. For example, external terminal 102 can be a point-of-sale (POS) device, a kiosk, or a mobile communication device such as a mobile telephone, a personal computer, a POS device, a personal digital assistant (PDA), a portable computing device, a radio frequency enabled transaction card, or the like.

Another external network component 120 is a visiting network 110, which is any electronic communication network that is communicatively coupled to external terminal 102 and one or more internal network components 118. Example visiting networks 110 include a mobile telephone carrier network, an external payment network and/or service, a media network, a private network, a public network, a Bluetooth™ network, an automated clearing house (ACH) network, a peer-to-peer (P2P) network, or the like.

Internal network components 118 include a gateway 112, which is communicatively coupled to visiting network 110. External terminal 102 communicates with internal network components 118 through visiting network 110. Gateway 112 translates communication network protocols to enable proper communication between visiting network 110 and internal network components 118. Gateway 112 also includes any number of communication network modules depending on the characteristics of visiting network 110 and internal network components 118. For instance, gateway 112 can include a firewall, a network address resolution table, a proxy for address translation, a session border controller, etc. (all not shown).

Another internal network component 118 is a security services module 114. Security services module 114 is communicatively coupled to gateway 112, and performs security functions such as encryption, decryption, key management, and/or any other functions suitable for ensuring the security, confidentiality, and/or integrity of data communicated throughout system 100.

Another internal network component 118 is home value (or valuation) module 106, which includes a memory or other electronic storage device (not shown) that electronically stores information related to electronic assets owned by the issuer. For example, home value 106 can store data entries representing credit, deposits, loyalty points, reward points, media, and the like. Each data entry of home value 106 has a value-base and an associated quantitative and/or qualitative value that also are stored in the memory (not shown) and are used by trust mediator 116 in order to assess security risks associated with that particular data entry.

Internal network components 118 also include a value mediator 104, which valuates electronic assets owned by an entity other than the issuer. These assets have a value-base other than the value-bases stored in home value 106. Value mediator 104 thus computes a quantitative value, and/or normalizes a qualitative value, for these assets to exchange the value across different value-bases. In addition, trust mediator 116 uses this quantitative value to compute risk magnitudes associated with these assets. For example, if the value of the transaction or commerce was an asset calculated by value mediator 104, then this computed value is input to trust mediator 116 to react by changing one or more protections, countermeasures, or policies related to the asset if thresholds associated with acceptable risk exposure are exceeded, or if user methods do not achieve an equilibrium between each player in the system, including stakeholders and criminals.

Trust mediator (TM) agents 108a-108f (collectively 108) are deployed on external terminal 102, visiting network 110, gateway 112, security services module 114, value mediator 104, and home value module 106, respectively. TM agents 108 detect and assess security-related information collected from one or more sensors corresponding to each respective network component and communicate this information to trust mediator 116. The sensors measure a physical quantity, such as an electronic signal or other data, and convert it into a signal which can be read by an observer and/or by an instrument, such as one or more of the TM agents 108 or trust mediator 116. The sensors can receive quantitative input, for example, from machines, electronics, etc. Alternatively, or in addition, the sensors can receive qualitative input from a human that initiates a topic of concern, such that data collection and normalization can be utilized for finite measurements, good will and intuitive measurements, and observations, which can then be validated with other qualitative or quantitative input. Trust mediator 116, in turn, communicates instructions to one or more of the TM agents 108 to modify implementation of security safeguards. Trust mediator 116 also assesses information received from the TM agents 108 and determines whether and/or how to modify security safeguards according to security and/or trust mediation algorithms that can be singular or a summation of plural safeguards and countermeasures interchangeable based on security goals.

An exemplary external terminal 102, as well as exemplary processes for adapting security measures of a communication network based on dynamic feedback, collecting data from sensors, and reporting the data to a trust mediator are disclosed in U.S. patent application Ser. No. 12/640,183, entitled "Systems, Methods, and Computer Program Products for Collecting and Reporting Sensor Data in a Communication Network," filed Dec. 17, 2009, which is hereby incorporated by reference in its entirety.

III. Process

A. Overview

1. Tree Diagrams

Figure 2:
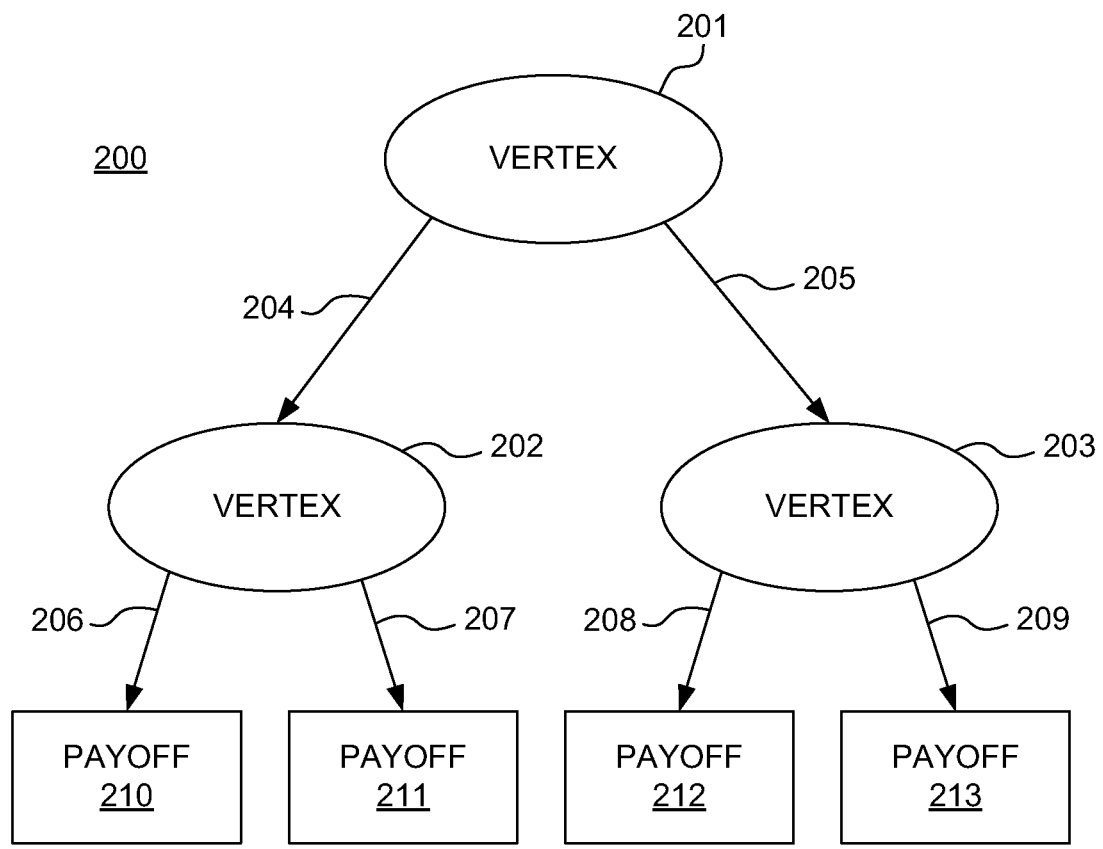
FIG. 2 depicts an exemplary tree diagram similar to those used in connection with game theory.

FIG. 2 depicts an exemplary tree diagram 200 similar to those used to represent games in game theory. Tree diagram 200 includes vertices 201-203, edges 204-209, and payoffs 210-213. At each vertex, a player (also sometimes referred to as a user) has a range of choices or moves. Based on the choice or move made at a vertex, the user navigates down an associated edge to another vertex or a payoff. For example, if at vertex 201 the user selects a choice corresponding to edge 204, then the user navigates to vertex 202. If at vertex 202 the user selects a choice corresponding to edge 206, then the user navigates to payoff 210 and the game has ended. Vertex 201 represents a nonterminal vertex, i.e., a vertex that has one or more children vertices. Vertices 202 and 203, which are children vertices of vertex 201, each represent a terminal vertex, i.e., a vertex having no children vertices, but instead having edges and associated payoffs. A payoff is a numerical value that corresponds to a terminal vertex of a tree diagram, that is, a specific ending to the corresponding game. For example, in a game like chess the payoffs could be +1 for winning, −1 for losing, and 0 for a draw.

Figure 3:
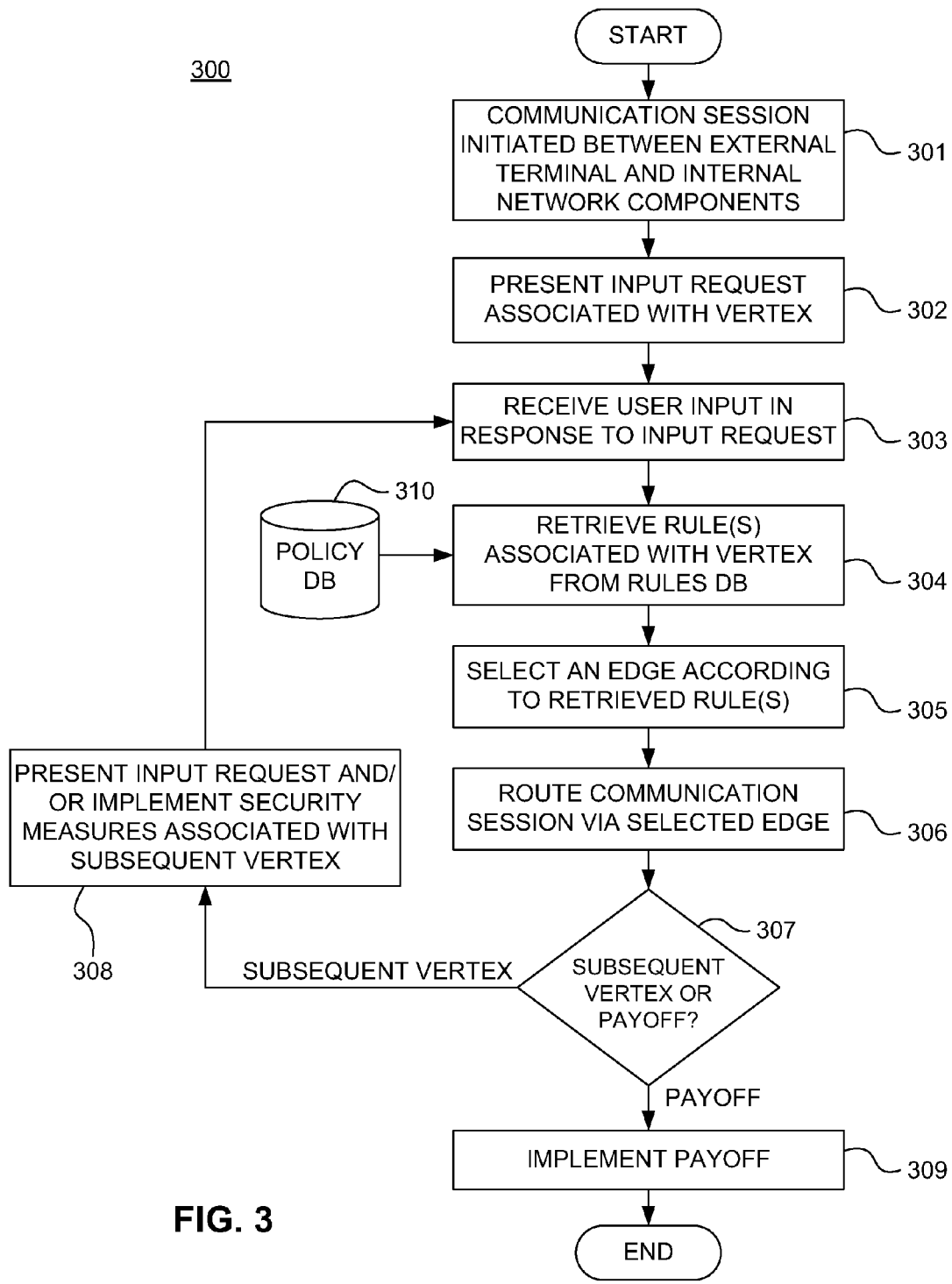
FIG. 3 is a flowchart illustrating an exemplary process for managing a dynamically adaptive policy to secure a mobile financial transaction.

In the context of the embodiments described herein, a policy for securing mobile financial transactions is represented by a tree diagram similar to the tree diagram described with respect to FIG. 2, including multiple vertices, edges, and payoffs. The tree diagram is stored in a policy database 310 (FIG. 3). A vertex is used to represent choices or moves presented to user 122 of external terminal 102 (FIG. 1) via a user interface during a communication session for utilizing services in connection with a financial account of user 122. Each edge to another vertex or payoff represents one or more corresponding security measures to be implemented during a portion of the communication session of user 122. A payoff represents an end of the game and can be a positive payoff, such as granting user 122 authorization to complete a financial transaction, or a negative payoff, such as denying user 122 authorization to complete a financial transaction.

As discussed below with respect to FIG. 3, policy database 310 includes all vertices, edges, payoffs, and rules that define a security policy, as well as associations between the vertices, edges, payoffs, and rules. Policy database 310 indicates all the edges, payoffs, and rules that are associated with a particular vertex. Security services module 114 retrieves from policy database 310 one or more rule(s) associated with each vertex. In general, the rule(s) associated with a particular vertex dictate a particular edge through which the communication session of each user 122 shall exit that vertex en route to a subsequent vertex or a payoff. Security services module 114 implements the policy defined in policy database 310 by routing the communication session of each user 122 through the tree diagram according to the rule(s) associated with each respective vertex.

2. Policy Overview

FIG. 3 is a flowchart illustrating an exemplary process 300 for managing a dynamically adaptive policy to secure a mobile financial transaction. At block 301, a communication session is initiated between a user 122 of external terminal 102 and internal network components 118. The communication session is initiated by either end. For example, user 122 may initiate the communication session by logging onto a website or portal of a financial account issuer to perform one or more account services in connection with a financial account of user 122. Or, one of internal network components 118 may initiate the communication session by transmitting an e-mail message to external terminal 102 requesting payment in connection with the financial account of user 122.

At block 302, an input request associated with a vertex is presented to user 122 via a user interface of external terminal 102, such as a graphical user interface (GUI), an audio user interface, and the like. The input request may include a request for data from user 122, such as user identification data, account identification data, etc. This data is used to identify a financial account of user 122 and/or to authenticate the identity of user 122. For example, user 122 may be requested to input data representing a username and password into external terminal 102 to identify, or associate to (e.g., by proxy), the financial account of user 122 and to authenticate the identity of user 122.

Alternatively, or in addition, the input request may include a request for a selection of a choice from a list of alternatives. User 122 is requested to select a desired account service from a list of different account services provided by a financial account issuer in connection with the financial account of user 122. Example account services include transferring funds between accounts, completing a point-of-sale transaction, completing a mobile-to-mobile payment, accessing account information, such as an account balance, transaction history, and the like. Additional examples of input requests associated with vertices are discussed in further detail below in connection with block 308.

At block 303, security services module 114 receives the data input by user 122 in response to the input request associated with the vertex and stores the received data in a database.

At block 304, security services module 114 retrieves from a policy database 310 one or more rule(s) associated with the vertex. Policy database 310 includes all vertices, edges, payoffs, and rules that define a security policy, as well as associations between the vertices, edges, payoffs, and rules. For example, policy database indicates all the edges, payoffs, and rules that are associated with a particular vertex. In general, the rule(s) associated with a particular vertex dictate a particular edge through which the communication session of user 122 shall exit that vertex en route to a subsequent vertex or a payoff. Example types of rules include a random number-based rule, a percentage-based rule, a user input-based rule, a security-related data-based rule, and a hybrid rule. Rules are discussed in further detail below in connection with FIG. 4.

At block 305, security services module 114 uses the rules retrieved at block 304 to select an edge from a group of edges associated with the vertex. An exemplary process 305 for selecting an edge from a group of edges associated with a vertex is discussed in further detail below in connection with FIG. 4.

At block 306, security services module 114 routes the communication session of user 122 down the edge that was selected at block 305. Routing, or logical routing, can include physical routing via electronic circuitry, such as routing electronic signals of the communication session down different circuit paths by using switches, routers, etc. Alternatively, or in addition, data of the communication session of user 122 is routed to different subroutines in a computer program. As explained above, each edge has an associated subsequent vertex or a payoff, as well as associated security measures. The vertex, payoff, and/or security measures associated with the selected edge are implemented by security services module 114.

At block 307, security services module 114 retrieves from policy database 310 the associations stored in connection with the edge. The associations indicate whether the edge selected at block 305 is associated with a subsequent vertex or a payoff. In particular, the associations stored in connection with the edge indicate (1) a starting point associated with the edge, which in this case is the vertex, and (2) an ending point associated with the edge, which is either a subsequent vertex or a payoff.

If security services module 114 determines that the edge selected at block 305 is associated with a subsequent vertex, then an input request associated with the subsequent vertex is presented to user 122 at block 308. In this case, security services module 114 also implements the security measures, if any, that are associated with the edge and/or the subsequent vertex. An exemplary process 308 for presenting an input request to a user 122 in accordance with a subsequent vertex, and/or implementing security measures associated with the subsequent vertex is discussed in further detail below in connection with FIG. 5.

If security services module 114 determines that the edge selected at block 305 is associated with a payoff, then the payoff is implemented at block 309. A payoff represents an end of the game and can be a positive payoff, such as granting user 122 an authorization to transfer funds between accounts, complete a point-of-sale transaction, complete a mobile-to-mobile payment, access account information, account balance, transaction history, and the like. Alternatively, the payoff can be a negative payoff, such as denying user 122 an authorization to transfer funds between accounts, complete a point-of-sale transaction, complete a mobile-to-mobile payment, access account information, account balance, transaction history, and the like. In one embodiment, a negative payoff includes compiling a data file associated with a noncooperative user, which may also be referred to herein as a noncooperative player, and forwarding the data file to authorities for further investigation and potential criminal prosecution.

B. Selecting an Edge

Figure 4:
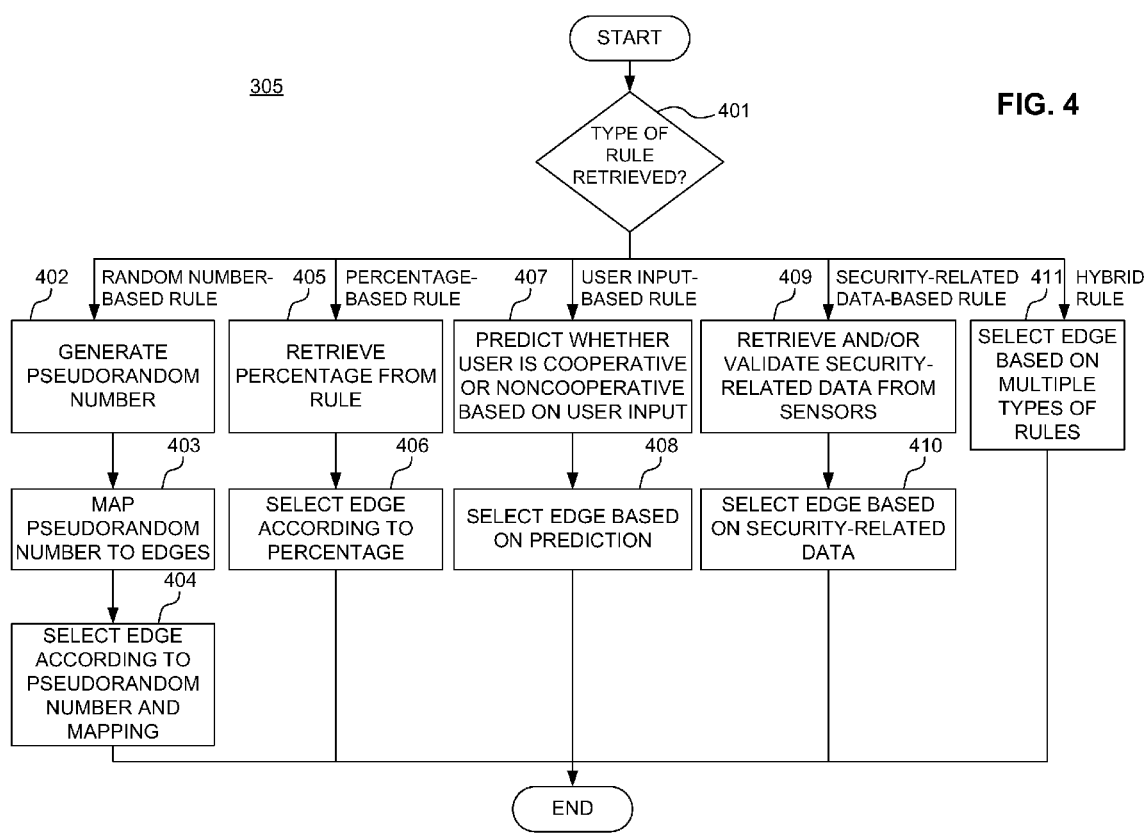
FIG. 4 is a flowchart illustrating an exemplary process for selecting an edge of a tree diagram.

FIG. 4 is a flowchart illustrating an exemplary process 305 for selecting an edge of a tree diagram. At block 401, security services module 114 determines which type of rule was retrieved at block 304 (FIG. 3) in association with the vertex. As shown in FIG. 4, example rule types include a random number-based rule, a percentage-based rule, a user input-based rule, a security-related data-based rule, and a hybrid rule. As will be understood by those skilled in the art, other rule types, such as a custom rule, a time-based rule, a location-based rule, and the like, are contemplated and are within the scope of the embodiments described herein.

1. Selecting an Edge According to a Random Number-Based Rule

If at block 401 security services module 114 determines that the rule that was retrieved at block 304 (FIG. 3) is a random number-based rule, then at block 402 security services module 114 randomly selects an edge from a group of edges associated with the vertex. For example, at block 403, a pseudorandom number generator is used to randomize the selection of the edge. A new pseudorandom number is generated each time a communication session is routed to the vertex associated with the random number-based rule. At block 404, an edge is selected according to the generated pseudorandom number and a mapping of possible pseudorandom numbers to available edges. For example, if there are a total of three edges associated with a particular vertex, then a mapping links each of the possible pseudorandom numbers to a corresponding one of the three available edges.

By randomly selecting an edge through which to route communication sessions of users, security services module 114 provides security measures that are difficult for noncooperative players to circumvent, particularly because the noncooperative players will be unaware of which specific security measures will be implemented for a communication session.

2. Selecting an Edge According to a Percentage-Based Rule

If at block 401 security services module 114 determines that the rule that was retrieved at block 304 (FIG. 3) is a percentage-based rule, then security services module 114 selects an edge according to a percentage defined in connection with the rule. In particular, at block 405 security services module 114 retrieves from policy database 310 (FIG. 3) a percentage defined in connection with the rule. At block 406, security services module 114 selects an edge according to the retrieved percentage. For instance, the rule for the vertex may dictate that a first edge shall be selected for 10% of the users and a second edge shall be selected for 90% of the users. In this case, security services module 114 routes 10% of the users down the first edge and 90% of the users down the second edge. In one embodiment, security services module 114 accomplishes this by routing every tenth user down the first edge and routing the remaining users down the second edge.

By using a percentage to select an edge through which to route communication sessions of users, security services module 114 provides security measures that balance the user satisfaction of experience using system 100 against the risk of loss of value for an account issuer. For instance, if highly rigorous security measures are implemented for all users, the risk of loss of value for the issuer is minimized but users will likely become burdened by the security measures and dissatisfied with system 100. If less rigorous security measures are implemented for all users, users will likely be less burdened by and more satisfied with system 100, but the risk of loss of value for account issuers is maximized. By setting a percentage at an equilibrium point, implementing more rigorous security measures for some users and less rigorous security measures for other users, security services module 114 provides a mechanism that balances user satisfaction and risk of loss of value.

3. Selecting an Edge According to a User Input-Based Rule

If at block 401 security services module 114 determines that the rule that was retrieved at block 304 (FIG. 3) is a user input-based rule, then security services module 114 selects an edge in response to the specific data that was inputted by user 122 at block 302 (FIG. 3). In particular, at block 407 security services module 114 utilizes the specific data that was inputted by user 122 to predict whether user 122 is a cooperative player or a noncooperative player.

In one embodiment, security services module 114 accomplishes this prediction by comparing the data or option that was input by user 122 at one or more vertices throughout a tree diagram to patterns of data and options stored in policy database 310 that are deemed likely to be inputted by a noncooperative player. The patterns are stored in policy database 310 along with corresponding numerical probabilities, which indicate, for each pattern, the likelihood that a user 122 that has inputted data or option matching the pattern is a noncooperative player. The numerical probabilities, in one embodiment, are derived from statistics associated with previous user communication sessions. Each user input-based rule includes a threshold defining a numerical probability above which the user is deemed a noncooperative player. Security services module 114 compares the data or option that was inputted by user 122 to the patterns. If the data or option that was inputted by user 122 matches a pattern, security services module 114 compares the probability associated with that pattern to the threshold defined in association with the rule retrieved at block 304. If the probability is less than or equal to the threshold then security services module 114 predicts that user 122 is a cooperative player. If the probability is greater than the threshold then security services module 114 predicts that user 122 is a noncooperative player.

The prediction of whether user 122 is a cooperative player or a noncooperative player can be persistent throughout an entire communication session, i.e., throughout multiple vertices, or persistent only throughout a particular vertex. That is, if the prediction of whether user 122 is a cooperative player or a noncooperative player is persistent throughout an entire communication session then user 122 is deemed a cooperative or noncooperative player, according to the prediction, for each vertex throughout the communication session. If the prediction of whether user 122 is a cooperative player or a noncooperative player is only persistent throughout a particular vertex then at subsequent vertices, user 122 is deemed neither a cooperative player nor a noncooperative player, unless an additional prediction is made. In this case, user 122 may be deemed a cooperative or noncooperative player according to additional predictions made at subsequent vertices. That is, although user 122 may be predicted to be a cooperative player at a first vertex, the user 122 may be predicted to be a noncooperative player at a subsequent vertex.

At block 408, security services module 114 selects an edge according to the prediction made at block 407.

In another embodiment, security services module 114 selects an edge by comparing the data or option that was inputted by user 122 at one or more vertices throughout a tree diagram to patterns of data and options stored in policy database 310 that are deemed likely to be inputted by a noncooperative player. Examples of patterns of data and options stored in policy database 310 that are deemed likely to be inputted by a noncooperative player include (1) input of a predetermined number of incorrect passwords, (2) selection of an option to withdraw a cash advance of the maximum available amount, (3) selection of an option to complete a transaction inconsistent with the past transaction history of the account of user 122, such as buying an automobile in a location distant from the home of user 122, etc.

If the data or option that was inputted by user 122 matches a pattern stored in policy database 310, then user 122 is predicted to be a noncooperative player and security services module 114 retrieves the probability associated with that pattern from policy database 310. Security services module 114 maps each possible probability to each available edge associated with the vertex. The edge to which the retrieved probability is mapped is selected. If, on the other hand, the data or option that was inputted by user 122 does not match a pattern, then user 122 is predicted to be a cooperative player and is routed down an edge designated for cooperative players.

By selecting an edge through which to route communication sessions of users according to specific data inputted by users, security services module 114 implements more rigorous security measures for users that are predicted to be noncooperative players, and less rigorous security measures for users that are predicted to be cooperating players. Security services module 114 thus maintains a balance between the user satisfaction of experience with system 100 and the risk of loss of value for account issuers.

4. Selecting an Edge According to a Security-Related Data-Based Rule

If at block 401 security services module 114 determines that the rule that was retrieved at block 304 (FIG. 3) is a security-related data-based rule, then at block 409 security services module 114 retrieves and/or validates security-related data detected and reported by various sensors distributed throughout system 100. Exemplary processes for collecting security-related data from sensors, and reporting the data to a trust mediator are disclosed in U.S. patent application Ser. No. 12/640,183, entitled "Systems, Methods, and Computer Program Products for Collecting and Reporting Sensor Data in a Communication Network," filed Dec. 17, 2009, which is hereby incorporated by reference in its entirety. Example security-related data that security services module 114 retrieves and/or validates at block 409 includes data indicating a geographical location of external terminal 102, data indicating a history of financial transactions completed via a financial account of user 122, and the like.

At block 406, security services module 114 selects an edge in response to the specific security-related data retrieved from and/or validated for various sensors distributed throughout system 100. For example, if security services module 114 retrieves data indicating a geographical location of external terminal 102 at block 409, then an edge is selected based on whether the geographical location is in a country different from the home country of user 122. That is, an edge associated with more rigorous security measures is selected if user 122 is using external terminal 102 in a foreign country. An edge associated with less rigorous security measures is selected if user 122 is using external terminal 102 within the home country of user 122.

In another embodiment, if security services module 114 retrieves data indicating a history of financial transactions completed via a financial account of user 122, then an edge is selected based on whether the history of transactions matches suspicious patterns stored in policy database 310. That is, an edge associated with more rigorous security measures is selected if the history of transactions matches a suspicious pattern stored in policy database 310. An edge associated with less rigorous security measures is selected if the history of transactions does not match any suspicious patterns stored in policy database 310.

By utilizing security-related data to select an edge through which to route communication sessions of users, security services module 114 implements more rigorous security measures for users that are predicted to be noncooperative players, and less rigorous security measures for users that are predicted to be cooperating players. Security services module 114 thus maintains a balance between the user satisfaction of experience with system 100 and the risk of loss of value for account issuers.

5. Selecting an Edge According to a Hybrid Rule

Security services module 114 optionally determines whether the rule that was retrieved at block 304 is a hybrid rule. A hybrid rule includes a combination of any two or more rule types, such as the example rule types discussed above in connection with blocks 402-410. That is, a hybrid rule may include a combination of a random number-based rule, a percentage-based rule, a user input-based rule, a security related data-based rule, and/or any other type of rule. If at block 401 security services module 114 determines that the rule that was retrieved at block 304 (FIG. 3) is a hybrid rule, then at block 411 security services module 114 selects an edge based on a combination of factors. For example, security services module 114 can select an edge according to a combination of two or more of procedures 502-505, which are described in further detail below.

In one embodiment, security services module 114 determines whether the rule retrieved at block 304 is a decoy payoff rule. If at block 401 security services module 114 determines that the rule retrieved at block 304 (FIG. 3) is a decoy payoff rule, then at block 411 security services module 114 determines whether to select an edge that routes the communication session to a vertex associated with a decoy payoff. Security services module 114 predicts whether user 122 is a noncooperative player by comparing the data that was inputted by user 122, the security-related data detected and reported by various sensors distributed throughout system 100, and/or any other available information to data predetermined to correspond to noncooperative players.

If security services module 114 predicts that user 122 is a noncooperative player then security services module 114 computes a probable payoff amount, which is an estimated payoff amount (e.g., an amount of U.S. currency) that the security services module 114 deems is likely to be obtained if the communication session is permitted to continue on system 100. The probable payoff amount is computed based on an accumulation of the data that was inputted by user 122, the security-related data detected and reported by various sensors distributed throughout system 100, and/or any other available information obtained by the security services module 114. Security services module 114 computes a payoff probability associated with the probable payoff, i.e., a probability that the probable payoff will be obtained if the communication session is permitted to continue on system 100. Security services module 114 also computes an expected value of the probable payoff by multiplying the probable payoff amount and the associated payoff probability. Data obtained by security services module 114 impacts the computation of the probable payoff amount, the associated payoff probability, and the expected value of the probable payoff. For example, the payoff probability is proportional to the number of security measures circumvented throughout the communication session as well as the duration of the communication session.

Security service module 114 computes a decoy payoff amount, which is a payoff amount that, if paid to the noncooperative player, is likely to induce the noncooperative player to cease communicating with system 100. The decoy payoff amount can be an amount of currency (e.g., U.S. dollars), data (e.g., financial transaction account data), and/or the like that would be forfeited as a decoy to protect more valuable assets, such as higher amounts of currency, data, and/or the like. In some cases, security services module 114 computes the decoy payoff amount by multiplying the computed probable payoff amount and/or the expected value of the probable payoff by a predetermined factor.

Security services module 114 compares the probable payoff amount and/or the expected value of the probable payoff to the computed decoy payoff amount to determine whether to implement the decoy payoff, i.e., to route the communication session to a vertex associated with the decoy payoff. In particular, security services module 114 compares the decoy payoff amount to costs predicted to be associated with permitting the communication session to continue further (e.g., the costs of expending assets to prevent the attack, the cost of disruption of business due to shutting down one or more components of system 100, and/or the like). If, for example, security services module 114 determines that the probable payoff amount is one hundred thousand U.S. dollars, then security services module 114 could route the communication session to a vertex that forfeits a decoy payoff of one thousand U.S. dollars, while collecting data and/or artifacts that would assist in a potential criminal prosecution of the noncooperative player.

If security services module 114 determines to implement the decoy payoff, then security services module 114 routes the communication session to a vertex associated with the decoy payoff. The communication session is thus diverted to a vertex that, in some embodiments, forfeits a decoy payoff amount, collects data for use in criminally prosecuting the noncooperative player, and/or prevents access to more valuable assets of system 100.

If security services module 114 predicts that user 122 is a cooperative player then security services module 114 selects an alternate edge, i.e., an edge that routes the communication session to a vertex not associated with a decoy payoff.

Figure 5:
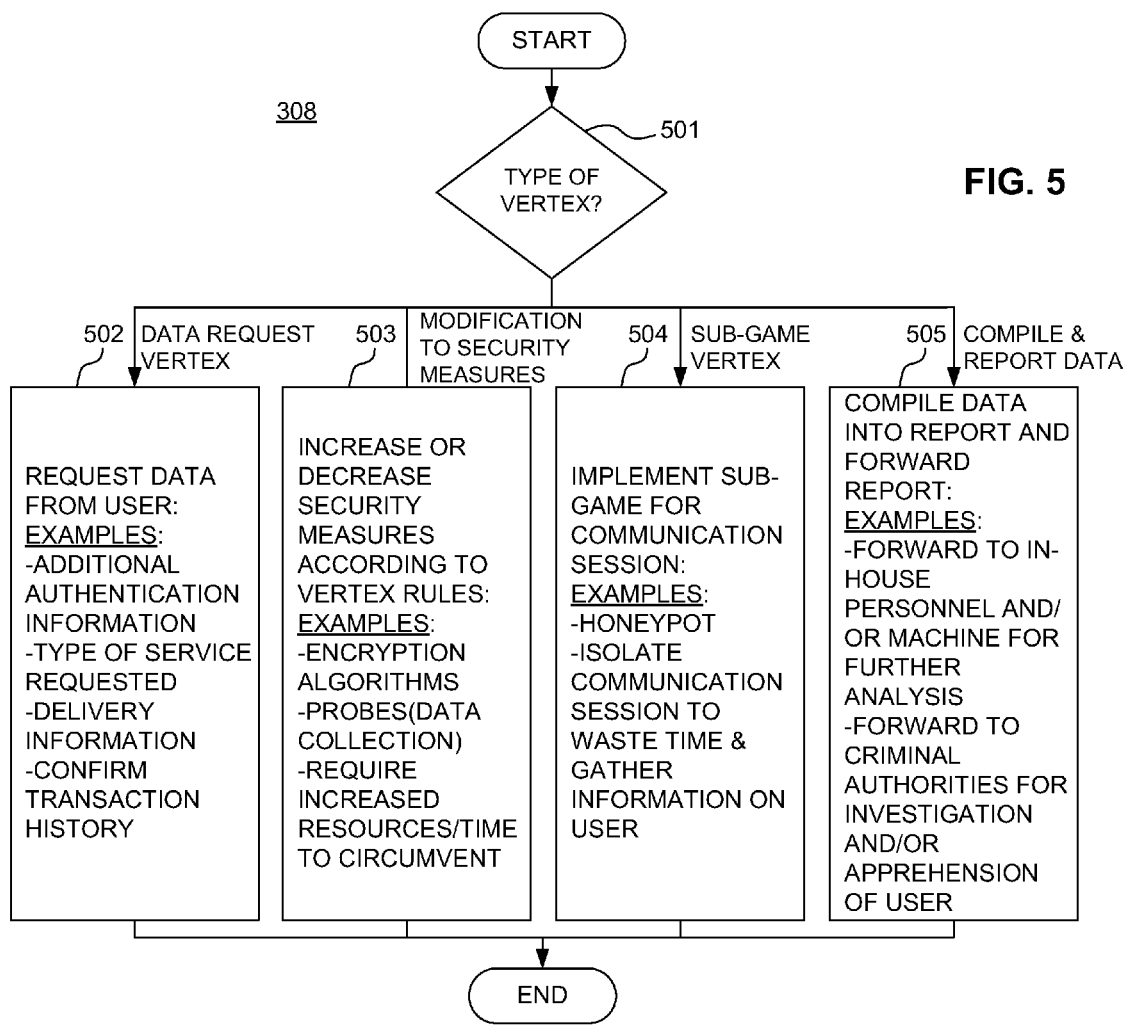
FIG. 5 is a flowchart illustrating an exemplary process for presenting an input request and/or implementing security measures associated with the subsequent vertex.

C. Presenting an Input Request and Implementing Security Measures Associated with a Subsequent Vertex FIG. 5 is a flowchart illustrating an exemplary process 308 for presenting an input request and/or implementing security measures associated with the subsequent vertex. At block 501, security services module 114 retrieves from policy database 310 a vertex type that corresponds to the subsequent vertex that was determined at block 307 (FIG. 3) to be associated with the edge that was selected at block 305 As shown in FIG. 5, example vertex types include a vertex that requests additional data from user 122, a vertex that modifies security measures, a sub-game vertex, and a vertex that compiles and reports data. As will be understood by those skilled in the art, other vertex types, such as a vertex associated with a combination of two or more of procedures 502-505, are contemplated and are within the scope of the embodiments described herein. Procedures 502-505 are described in further detail below.

1. A Subsequent Vertex that Requests Additional Data

If at block 501 security services module 114 determines that the subsequent vertex that was identified at block 307 (FIG. 3) requests additional data from user 122, then at block 502 security services module 114 presents a request for additional data to user 122 via external terminal 102. Example types of additional data requested by security services module 114 include additional authentication data, data indicating the type of account service requested by user 122, data indicating a delivery address of user 122, data confirming or disconfirming the accuracy of presented financial transaction history associated with an account of user 122, etc. As will be understood by those skilled in the art, other types of data requests are contemplated and are within the scope of the embodiments described herein.

In one embodiment, at block 502 security services module 114 requests additional authentication data, such as a mother's maiden name, an amount of a previous financial transaction, etc., from user 122 via external terminal 102 in response to predicting that user 122 is a noncooperative player. Security services module 114 verifies the additional authentication data against authentication data stored in a database (not shown) in connection with a financial account of user 122. User 122 is then routed to yet another subsequent edge, or a payoff according to whether the additional authentication data inputted by user matches the authentication data stored in the database. For instance, if the additional authentication data inputted by user 122 matches the authentication data stored in the database, user 122 may receive authorization to complete a financial transaction. If the additional authentication data inputted by user 122 fails to match the authentication data stored in the database, user 122 may be denied authorization to complete a financial transaction.

In another embodiment, at block 502 security services module 114 requests data indicating the type of account service requested by user 122. In this way, if user 122 has been predicted to be a noncooperative player at a previous vertex, and user 122 requests to complete a point-of-sale transaction, user 122 can be routed to a negative payoff such as a payoff denying the point-of-sale transaction. Alternatively, if user 122 has been predicted to be a noncooperative player at a previous vertex, and user 122 merely requests access to account balance information, user 122 can be routed to a vertex permitting access to false, i.e., honeypot, account balance information, while security services module 114 monitors the behavior of user 122.

In an alternative embodiment, at block 502 security services module 114 requests data indicating a delivery address of user 122 in response to predicting that user 122 is a noncooperative player. In this way, it appears to noncooperative user 122 that they have successfully circumvented security measures to complete a transaction, meanwhile, security services module 114 has forwarded the address information to authorities for investigation.

In yet another embodiment, at block 502 security services module 114 requests data confirming or disconfirming the accuracy of presented financial transaction history associated with an account of user 122. Security services module 114 can present inaccurate or accurate financial transaction history to user 122. If security services module 114 presents accurate financial transaction history to user 122, and user 122 confirms the history, then user 122 is routed to a positive payoff. For example, the user 122 is granted access to financial account data. If security services module 114 presents inaccurate financial transaction history to user 122 and user confirms the history, then user 122 is deemed a noncooperative player and is routed to a negative payoff. For example, an IP address of the user 122 is forwarded to authorities for investigation and potential criminal prosecution of user 122.

2. A Subsequent Vertex that Modifies Security Measures

If at block 501 security services module 114 determines that the vertex that was identified at block 307 (FIG. 3) modifies security measures, then at block 503 security services module 114 implements security measures of increased or decreased rigorousness according to the rule associated with the subsequent vertex. In this way, security services module 114 provides security that is tailored to the likelihood that user 122 is cooperative or noncooperative. Example modifications to security measures are disclosed in U.S. patent application Ser. No. 12/690,461, entitled "Dynamically Reacting Policies and Protections for Securing Mobile Financial Transaction Data in Transit," filed Jan. 20, 2010, which is hereby incorporated by reference in its entirety.

3. A Sub-Game Subsequent Vertex

If at block 501 security services module 114 determines that the vertex that was identified at block 307 (FIG. 3) corresponds to a sub-game vertex then at block 504 security services module 114 implements the sub-game associated with the subsequent vertex. In one embodiment, a honeypot sub-game is implemented where user 122 is presented with honeypot data, such as false data or account services, giving the appearance that user 122 has circumvented security measures, while user 122 is actually being monitored by security personnel and/or machines gathering information on current hacking techniques implemented by user 122.

In another embodiment, the communication session of user 122 is isolated into an infinite loop to keep the user 122 occupied, maintaining contact, while monitoring and gathering information about the user 122 and the hacking techniques implemented by user 122.

4. A Subsequent Vertex That Compiles and Reports Data

If at block 501 security services module 114 determines that the vertex that was identified at block 307 (FIG. 3) compiles and reports data then at block 505 security services module 114 compiles and reports data. In one embodiment, security services module 114 compiles data on the identity of noncooperative user 122, as well as the potentially criminal attempts of user 122 to hack system 100, and forwards the compiled data to in-house personnel and/or machine for further analysis. Alternatively, or in addition, security services module 114 forwards the compiled data to criminal authorities for further investigation and/or criminal prosecution. In this way, a negative payoff is provided to noncooperative players, thereby discouraging them from misusing system 100.

D. Generating a Tree Diagram

Figure 6:
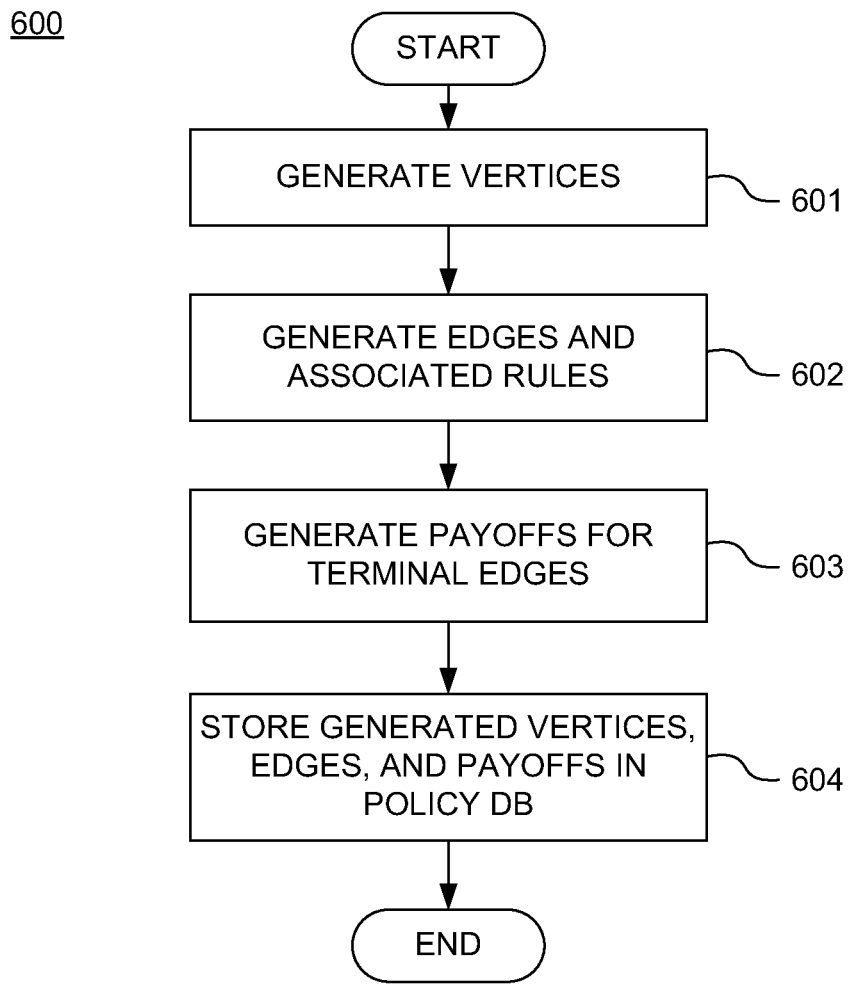
FIG. 6 is a flowchart illustrating an exemplary process for generating a tree diagram for a dynamically adaptive policy securing mobile financial transactions.

FIG. 6 is a flowchart illustrating an exemplary process 600 for generating a tree diagram for a dynamically adaptive policy securing mobile financial transactions. In general, vertices, rules, and payoffs are generated and are stored in policy database 310. Vertices are discussed in further detail above in connection with blocks 302 and 308 (FIG. 3). Edges and rules are discussed in further detail above in connection with blocks 304-306 (FIG. 3). Positive and negative payoffs are discussed in further detail above in connection with block 309 (FIG. 3). Implementation of the tree diagram policy is discussed in further detail above in connection with FIG. 3.

At block 601, multiple vertices are generated for presenting users 122 with input requests.

At block 602, edges and rules are generated in association with one or more of the vertices that were generated at block 601.

At block 603, positive and/or negative payoffs are generated for terminal vertices that were generated at block 601.

At block 604, the vertices, edges, and payoffs that were generated at blocks 601-603, respectively, are stored in policy database 310 (FIG. 3) for implementation by security services module 114

IV. Example Implementations

The present invention (e.g., system 100, processes 200, 300, 305, 308, and 600, or any part(s) or function(s) thereof) can be implemented using hardware, software or a combination thereof and can be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 7:
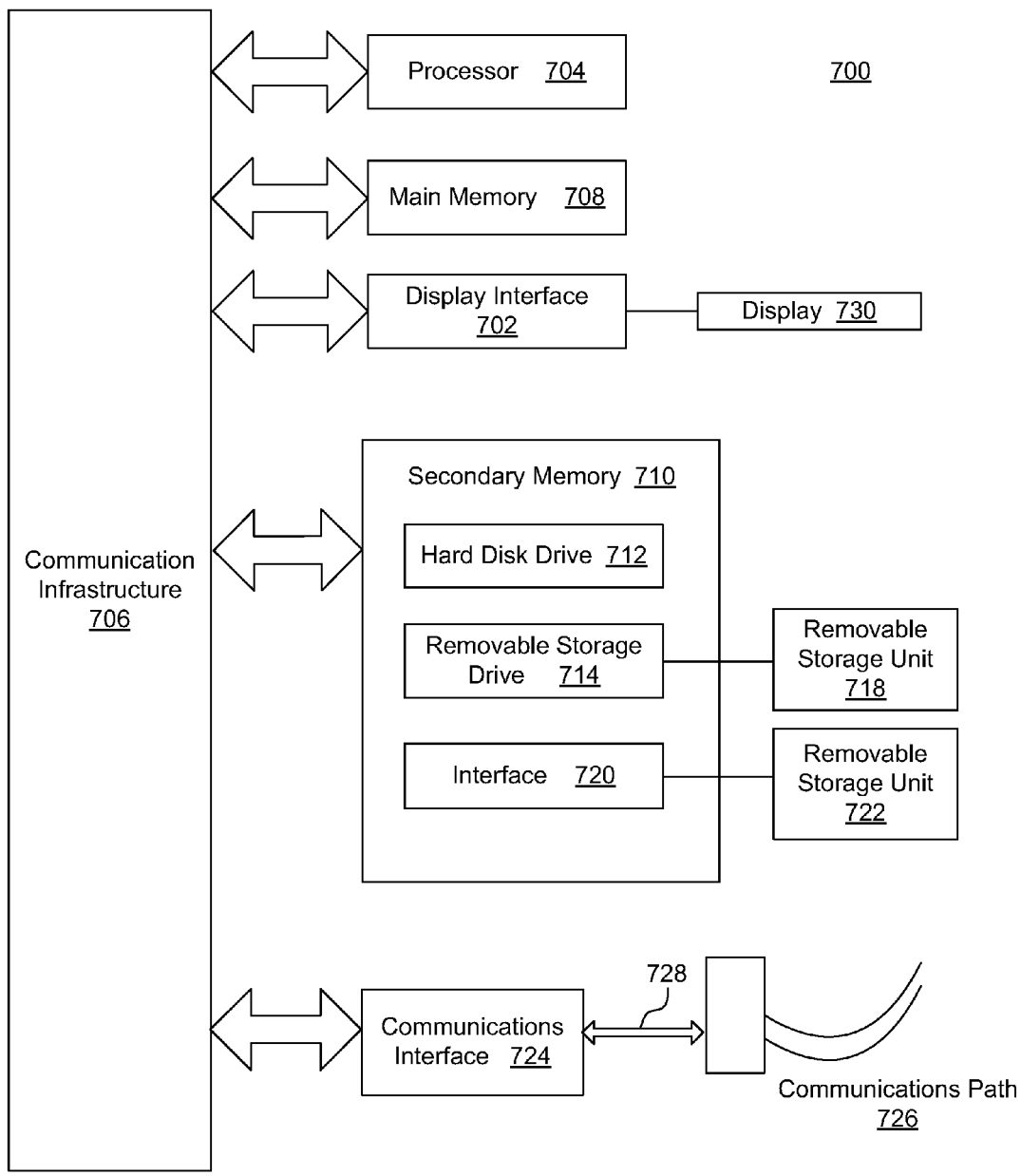
FIG. 7 is a block diagram of an exemplary computer system useful for implementing the present invention.

In fact, in one embodiment, the invention is directed toward one or more computer systems capable of carrying out the functionality described herein. An example of a computer system 700 is shown in FIG. 7.

Computer system 700 includes one or more processors, such as processor 704. The processor 704 is connected to a communication infrastructure 706 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 700 can include a display interface 702 that forwards graphics, text, and other data from the communication infrastructure 706 (or from a frame buffer not shown) for display on the display unit 730.

Computer system 700 also includes a main memory 708, preferably random access memory (RAM), and can also include a secondary memory 710. The secondary memory 710 can include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well known manner. Removable storage unit 718 represents a floppy disk, magnetic tape, optical disk, etc. which is read by and written to by removable storage drive 714. As will be appreciated, the removable storage unit 718 includes a computer usable storage medium having stored therein computer software and/or data.

In alternative embodiments, secondary memory 710 can include other similar devices for allowing computer programs or other instructions to be loaded into computer system 700. Such devices can include, for example, a removable storage unit 722 and an interface 720. Examples of such can include a program cartridge and cartridge interface (such as that found in video game devices), a removable memory chip (such as an erasable programmable read only memory (EPROM), or programmable read only memory (PROM)) and associated socket, and other removable storage units 722 and interfaces 720, which allow software and data to be transferred from the removable storage unit 722 to computer system 700.

Computer system 700 can also include a communications interface 724. Communications interface 724 allows software and data to be transferred between computer system 700 and external devices. Examples of communications interface 724 can include a modem, a network interface (such as an Ethernet card), a communications port, a Personal Computer Memory Card International Association (PCMCIA) slot and card, etc. Software and data transferred via communications interface 724 are in the form of signals 728 which can be electronic, electromagnetic, optical or other signals capable of being received by communications interface 724. These signals 728 are provided to communications interface 724 via a communications path (e.g., channel) 726. This channel 726 carries signals 728 and can be implemented using wire or cable, fiber optics, a telephone line, a cellular link, a radio frequency (RF) link and other communications channels.

In this document, the terms "computer program medium," "computer-readable medium," and "computer-usable medium" are used to generally refer to media such as removable storage drive 714, a hard disk installed in hard disk drive 712, and/or signals 728. These computer program products provide software to computer system 700. The invention is directed to such computer program products.

Computer programs (also referred to as computer control logic) are stored in main memory 708 and/or secondary memory 710. Computer programs can also be received via communications interface 724. Such computer programs, when executed, enable the computer system 700 to perform the features of the present invention, as discussed herein. In particular, the computer programs, when executed, enable the processor 704 to perform the features of the present invention. Accordingly, such computer programs represent controllers of the computer system 700.

In an embodiment where the invention is implemented using software, the software can be stored in a computer program product and loaded into computer system 700 using removable storage drive 714, hard drive 712 or communications interface 724. The control logic (software), when executed by the processor 704, causes the processor 704 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software, with automated and man-in-the-loop operations.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it can be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A method comprising:
    storing, in a database, a plurality of patterns and a plurality of numerical probabilities that a user is either a cooperative user or a noncooperative user, the plurality of patterns corresponding to the plurality of numerical probabilities, respectively;
    presenting, via an external terminal, an input request associated with a vertex of a security policy;
    receiving, via the external terminal, user input in response to the input request;
    predicting whether the user of the external terminal is the cooperative user or the noncooperative user by:
        matching the user input to one of the plurality of patterns;
        identifying one of the plurality of numerical probabilities that corresponds to the one of the plurality of patterns obtained by the matching;
        comparing the one of the plurality of numerical probabilities obtained by the identifying to a predetermined threshold; and
        designating the user as either the cooperative user or the noncooperative user based on a result of the comparing;
    retrieving, from the database, a rule associated with the vertex;
    selecting an edge from a plurality of edges associated with the vertex based on the retrieved rule and a result of the predicting;
    routing a communication session of the external terminal to a subsequent vertex via the selected edge;
    generating, by a pseudorandom number generator, a pseudorandom number for each available edge of the subsequent vertex;
    selecting, based on the pseudorandom number, a first edge of the subsequent vertex;
    transmitting, by a security services module and in response to the selecting the first edge, false data to the external terminal;
    receiving, by the security services module and from the external terminal, a user response to the false data including a confirmation of the false data;
    compiling, by the security services module, the user response to the false data;
    gathering, by the security services module, information on a current hacking technique being utilized from the external terminal;
    recording, by the security services module, an IP address of the external terminal;
    transmitting, by the security services module, the IP address of the external terminal to a third party;
    computing, by the security services module, a probable payoff amount comprising an estimated payoff amount that the external terminal will obtain using the current hacking technique;
    computing, by the security services module, a decoy payoff amount by multiplying the probable payoff amount by a predetermined factor;
    routing, by the security services module, the communication session to a decoy payoff vertex; and
    transferring, by the security services module, the decoy payoff amount to the user.

2. The method of claim 1, wherein the rule includes at least one of a random number-based rule, a percentage-based rule, a user input-based rule, a security-related data-based rule, or a hybrid rule.

3. The method of claim 1, wherein the vertex is further associated with at least one of a request for additional data from the user, a modification of a security measure, a sub-game including additional vertices and edges, or a compilation of data and a forwarding of the compilation of the data to a computer system of an authority for further investigation.

4. The method of claim 1, wherein the predicting further includes predicting whether the user of the external terminal is the cooperative user or the noncooperative user based on statistics stored in the database, and
    wherein the selecting the edge from the plurality of edges associated with the vertex according to the retrieved rule further includes:
        selecting a first edge from the plurality of edges if the user is predicted to be the cooperative user; or
        selecting a second edge from the plurality of edges if the user is predicted to be the noncooperative user.

5. The method of claim 4, further comprising:
    presenting honeypot data to the user of the external terminal if the user is predicted to be the noncooperative user.

6. The method of claim 1, wherein the input request includes a request for a confirmation of inaccurate financial transaction history, and wherein the user is predicted to be the noncooperative user if the confirmation is received from the user via the external terminal.

7. A system comprising:
    a security services module, including a processor coupled to a memory, operable to:
        store, in a database, a plurality of patterns and a plurality of numerical probabilities that a user is either a cooperative user or a noncooperative user, the plurality of patterns corresponding to the plurality of numerical probabilities, respectively;
        present, via an external terminal, an input request associated with a vertex of a security policy;
        receive, via the external terminal, user input in response to the input request;
        predict whether the user of the external terminal is the cooperative user or the noncooperative user by:
            matching the user input to one of the plurality of patterns;

identifying one of the plurality of numerical probabilities that corresponds to the one of the plurality of patterns obtained by the matching;

comparing the one of the plurality of numerical probabilities obtained by the identifying to a predetermined threshold; and designating the user as either the cooperative user or the noncooperative user based on a result of the comparing;

retrieve, from the database, a rule associated with the vertex;

select an edge from a plurality of edges associated with the vertex based on the retrieved rule and a result of the predicting;

route a communication session of the external terminal to a subsequent vertex via the selected edge;

generate, by a pseudorandom number generator, a pseudorandom number for each available edge of the subsequent vertex;

select, based on the pseudorandom number, a first edge of the subsequent vertex;

transmit, by the security services module and in response to the selecting the first edge, false data to the external terminal;

receive, by the security services module and from the external terminal, a user response to the false data including a confirmation of the false data;

compile, by the security services module, the user response to the false data;

gather, by the security services module, information on a current hacking technique being utilized from the external terminal;

record, by the security services module, an IP address of the external terminal;

transmit, by the security services module, the IP address of the external terminal to a third party;

compute, by the security services module, a probable payoff amount comprising an estimated payoff amount that the external terminal will obtain using the current hacking technique;

compute, by the security services module, a decoy payoff amount by multiplying the probable payoff amount by a predetermined factor;

route, by the security services module, the communication session to a decoy payoff vertex; and transfer, by the security services module, the decoy payoff amount to the user.

8. The system of claim 7, wherein the rule includes at least one of a random number-based rule, a percentage-based rule, a user input-based rule, a security-related data-based rule, or a hybrid rule.

9. The system of claim 7, wherein the vertex is further associated with at least one of a request for additional data from the user, a modification of a security measure, a sub-game including additional vertices and edges, or a compilation of data and a forwarding of the compilation of the data to a computer system of an authority for further investigation.

10. The system of claim 7, wherein the processor is further operable to:

predict whether the user of the external terminal is the cooperative user or the noncooperative user based on statistics stored in the database;

select a first edge from the plurality of edges if the user is predicted to be the cooperative user; and select a second edge from the plurality of edges if the user is predicted to be the noncooperative user.

11. The system of claim 10, wherein the processor is further operable to:

present honeypot data to the user of the external terminal if the user is predicted to be the noncooperative user.

12. The system of claim 7, wherein the input request includes a request for a confirmation of inaccurate financial transaction history, and wherein the user is predicted to be the noncooperative user if the confirmation is received from the user via the external terminal.

13. A non-transitory computer-readable medium having stored thereon sequences of instructions, the sequences of instructions including instructions, which, when executed by a computer system, cause the computer system to perform:

storing, in a database, a plurality of patterns and a plurality of numerical probabilities that a user is either a cooperative user or a noncooperative user, the plurality of patterns corresponding to the plurality of numerical probabilities, respectively;

presenting, via an external terminal, an input request associated with a vertex of a security policy;

receiving, via the external terminal, user input in response to the input request;

predicting whether the user of the external terminal is the cooperative user or the noncooperative user by:
matching the user input to one of the plurality of patterns;

identifying one of the plurality of numerical probabilities that corresponds to the one of the plurality of patterns obtained by the matching;

comparing the one of the plurality of numerical probabilities obtained by the identifying to a predetermined threshold; and designating the user as either the cooperative user or the noncooperative user based on a result of the comparing;

retrieving, from the database, a rule associated with the vertex;

selecting an edge from a plurality of edges associated with the vertex based on the retrieved rule and a result of the predicting;

routing a communication session of the external terminal to a subsequent vertex via the selected edge;

generating, by a pseudorandom number generator, a pseudorandom number for each available edge of the subsequent vertex;

selecting, based on the pseudorandom number, a first edge of the subsequent vertex;

transmitting, by a security services module and in response to the selecting the first edge, false data to the external terminal;

receiving, by the security services module and from the external terminal, a user response to the false data including a confirmation of the false data;

compiling, by the security services module, the user response to the false data;

gathering, by the security services module, information on a current hacking technique being utilized from the external terminal;

recording, by the security services module, an IP address of the external terminal;

transmitting, by the security services module, the IP address of the external terminal to a third party;

computing, by the security services module, a probable payoff amount comprising an estimated payoff amount that the external terminal will obtain using the current hacking technique;

computing, by the security services module, a decoy payoff amount by multiplying the probable payoff amount by a predetermined factor;

routing, by the security services module, the communication session to a decoy payoff vertex; and transferring, by the security services module, the decoy payoff amount to the user.

14. The computer-readable medium of claim 13, wherein the rule includes at least one of a random number-based rule, a percentage-based rule, a user input-based rule, a security-related data-based rule, or a hybrid rule.

15. The computer-readable medium of claim 13, wherein the vertex is further associated with at least one of a request for additional data from the user, a modification of a security measure, a sub-game including additional vertices and edges, or a compilation of data and a forwarding of the compilation of the data to an authority computer system of an authority for further investigation.

16. The computer-readable medium of claim 13, wherein the sequences of instructions further include instructions, which, when executed by the computer system, cause the computer system to perform:

predicting whether the user of the external terminal is the cooperative user or the noncooperative user based on statistics stored in the database;

selecting a first edge from the plurality of edges if the user is predicted to be the cooperative user; and selecting a second edge from the plurality of edges if the user is predicted to be the noncooperative user.

17. The computer-readable medium of claim 16, wherein the sequences of instructions further include instructions, which, when executed by the computer system, cause the computer system to perform:

presenting honeypot data to the user of the external terminal if the user is predicted to be the noncooperative user.

18. The computer-readable medium of claim 13, wherein the input request includes a request for a confirmation of inaccurate financial transaction history, and wherein the user is predicted to be the noncooperative user if the confirmation is received from the user via the external terminal.

* * * * *